(12) United States Patent
Räisänen

(10) Patent No.: US 7,266,121 B2
(45) Date of Patent: Sep. 4, 2007

(54) FLOW LABELS

(75) Inventor: Vilho I. Räisänen, Helsinki (FI)

(73) Assignee: Nokia Corporation, Espoo (FI)

( * ) Notice: Subject to any disclaimer, the term of this patent is extended or adjusted under 35 U.S.C. 154(b) by 1017 days.

(21) Appl. No.: 10/329,750

(22) Filed: Dec. 27, 2002

(65) Prior Publication Data

US 2004/0125797 A1    Jul. 1, 2004

(51) Int. Cl.
    H04L 12/56    (2006.01)
(52) U.S. Cl. ...................... 370/392; 370/229
(58) Field of Classification Search ............ 370/389, 370/392, 229
    See application file for complete search history.

(56) References Cited

U.S. PATENT DOCUMENTS

| | | | | |
|---|---|---|---|---|
| 6,084,855 | A * | 7/2000 | Soirinsuo et al. ........... | 370/235 |
| 6,330,239 | B1 * | 12/2001 | Suzuki ..................... | 370/395.1 |
| 7,058,728 | B1 * | 6/2006 | Eklund ..................... | 709/247 |
| 2001/0023443 | A1 | 9/2001 | Fichou et al. | |
| 2001/0047423 | A1 * | 11/2001 | Shao et al. ................. | 709/235 |
| 2003/0112753 | A1 * | 6/2003 | Jo et al. .................... | 370/229 |
| 2003/0117988 | A1 * | 6/2003 | Asano et al. ............... | 370/338 |
| 2003/0123485 | A1 * | 7/2003 | Yi et al. ..................... | 370/477 |

FOREIGN PATENT DOCUMENTS

EP    0 982 909 A2    3/2000

OTHER PUBLICATIONS

Banerjee, et al., "*A Modified Specification for use of the IPv6 Flow Label for providing An efficient Quality of Service using a hybrid approach*", XP-002293008.
Rajahalme, et al., "*IPv6 Flow Label Specification*", XP-002293009.

\* cited by examiner

*Primary Examiner*—Brian Nguyen
(74) *Attorney, Agent, or Firm*—Foley & Lardner LLP

(57) ABSTRACT

There is disclosed a system for monitoring a packet data flow, comprising: a data flow source element including: determining means adapted to determine a quality of service identifier for the data flow; first generating means adapted to generate an encoded value in dependence on the quality of service identifier; allocating means adapted to allocate the quality of service identifier and the encoded value to the flow label for each data packet of the data flow; and transmitting means for forwarding data packets including flow labels to a routing domain; and a routing domain interface element including: receiving means for receiving data packets from the data flow source; second generating means adapted to generate a further encoded value in dependence on the quality of service identifier in a flow label of a data packet; comparing means adapted to compare the further encoded value to the encoded value in the flow label; and routing means adapted to selectively route the data packets in dependence on the comparing step.

39 Claims, 3 Drawing Sheets

FLOW LABELS

FIELD OF INVENTION

The present invention relates to allocating a flow label for a packet data flow.

BACKGROUND TO THE INVENTION

Communications networks are commonplace today, providing communication services between users. Some of these networks are adapted to handle packet data, where individual data packets or units are used for transferring the data in the communication between two or more signaling points, such as two terminals or other nodes in the communication system. Packet data networks may be roughly divided into two categories: connection-oriented and connectionless.

In connection-oriented networks, also known as circuit switched networks, a virtual-circuit is set up between the source and destination node using appropriate call set-up and admission control techniques. This circuit, which may span several intermediate nodes in the network, remains open for the duration of the communication, with all data packets relating to the communication being transmitted over the circuit. The effect is analogous to a voice call on a standard phone line such as over a public switched telephone network (PSTN). An example of a connection-oriented network is a X.25 network used for transmitting data packets.

In connection-less networks, also known as packet switched networks, no predetermined fixed circuit is set up between the source and destination nodes for the transfer of the data packets in the communication. Instead, data packets are routed on a 'hop-by-hop' basis from the source node to the destination node via intermediate nodes. At each intermediate node in receipt of a data packet, the header of the data packet is examined and the data packet then routed to another node that is closer to the destination node. This process is repeated at each intermediate node until the data packet reaches the destination node. An example of a connection-less network is the Internet or an Internet Protocol (IP) network, which operates under TCP/IP (Transport Control Protocol/Internet Protocol). It should be noted that the terms 'node' and 'router' may be used interchangeably in this description as references to an IP network are made, wherein routers act as nodes that route data.

In both types of network, a sequence of related data packets that typically makes up the data in a communication between two terminals is often called a data flow or data stream.

Data may become congested at network nodes if the data is received at a node at a rate greater than the maximum data throughput rate at that node. Typically, congestion occurs at a node when the node has a lower data throughput rate than the node that precedes it in the same direction or flow. Similarly, congestion occurs when a node receives data from a plurality of data sources and the sum of the input data rates exceeds the data throughput of the node.

Many IP networks use a so-called "best effort" model where no guarantees about packet loss or transfer delay are made. Packet loss generally occurs at the buffers of an IP router. In the best effort model, the output buffers of an IP router are typically a first-in first-out (FIFO) type of queue. If a buffer becomes full then new data packets are simply dropped regardless of their origin or the flow that they belong to.

Methods have been developed to manage networks so that the forwarding service provided by the network to packets, particularly data packets in a communication that is deemed to be of particular importance by the user, is predictable and engineerable. Managing of network resources to produce engineered performance according to requirement of different services may include Quality of Service (QoS).

From the network point of view, QoS can be viewed as a set of parameters that provide an indication of the quality of service that is expected from the network at any given time. For example, if a data flow is assigned a set of QoS parameters defining a packet loss rate and an end-to-end delivery delay for the data packets in the flow, the network nodes handling the routing of the data packets should prioritise the routing of the node so that the QoS defined is maintained for the data flow.

The Internet Engineering Task Force (IETF) has defined a 'flow label' field for use in IP version 6, (IPv6). The flow label is a 20-bit field for use in the header of an IPv6 data packet. It has been envisaged that the flow label be used to identify a traffic flow to which a data packet belongs or to give a data packet some flow-specific treatment. The nodes in the IP network can use information stored within the each node to process the data in a flow in accordance with the flow label. Therefore, each node optimally manages the data flows.

The IETF has also developed a standard for the QoS approach called Differentiated Services (DiffServ). In the DiffServ model data packets have six bits in the packet header called a DiffServ Code Point (DSCP), which indicates how an IP router should handle a data packet. A DSCP is marked on a field that can be found in both IPv4 and IPv6 headers. In IPv6 headers, the DSCP is marked in the 8-bit traffic class field. The DSCP corresponds to a Per-Hop Behaviour (PHB) for a packet, giving an indication of the priority of the data packet. The PHB is allocated to the packets belonging to a flow based on the QoS or a service level requirement of an application. Data flows requiring a high QoS will be marked with a suitable DSCP to reflect this. Differently marked packets may receive a different priority in queuing and/or scheduling of nodes. DSCP is used as a token of the PHB assigned to the packet at the edge of the DiffServ domain. In DiffServ, packets are prioritised with respect to forwarding and dropping based upon the DSCPs marked in the packet headers. Thus it is possible to start to discard, for example, low priority IP packets first before the buffers of an IP router are completely full and only discard higher priority packets when congestion becomes worse. This technique leaves buffer space for the higher priority packets, which will not see any congestion at all.

Flow labels are used in conjunction with a source identifier or source address and destination identifier or destination address to form a triplet that enables efficient flow classification. All data packets in a given data flow are marked with the flow label assigned to that data flow. The triplet of each data flow uniquely identifies the flow and distinguishes it from other flows. Practical implementation of this requires support from the sending IP host. Thus, where a traffic class adopting for example DSCP only allows for identification of a traffic aggregate (PHB), such as a QoS, properly implemented flow label allows identification of individual flows uniquely using only data in the basic IP header, namely the flow label, source address and destination address. Without the flow label, information identifying the flow would need to be extracted from higher-layer headers, e.g. TCP (transport control protocol) and UDP (user datagram protocol) headers. When cryptographic methods are used, such as IPSec (IP security protocol), higher-layer headers may not be available in plaintext, thereby removing the ability to identify the flow using the higher-layer headers.

Furthermore, a DSCP is typically assigned per transport domain (also known as the Autonomous Domain, AD). The definition of a DSCP can differ across ADs, and thus different DSCP markings could be used along the end-to-end path in different domains for any given flow. As a result, by using DiffServ and DSCP alone there is no record of the original end-to-end QoS assigned to the flow in question. The flow label can be used for this purpose. However, the use of the 20-bits of the flow label has not yet been standardized, and currently there are no plans to do so.

One way to use the flow label in recording end-to-end QoS requirements is to use extra-data plane mechanisms such as signaling of the state associated with flow label across domain boundaries. Alternatively, the QoS requirement for the flow could be marked directly into the flow label. Such marking could be based on classification for delay and packet loss, for example. In another example, a DSCP could be marked to the flow label, reflecting the original PHB allocated to the flow.

The use of flow labels forms an important part of communications in IP networks. A problematic area in their use is termed 'theft-of-service', which could affect the use of a flow label for QoS. Theft-of-service could occur when a data flow is marked with a better QoS class onto the flow label than that to which it is entitled. The result is that the packet data of the data flow may not be processed in the manner allowed to the sender by the network operator. Thus there is a need to authenticate the flow label marking against the QoS or service level allocated to the user, such as a DSCP, to ensure that the flow label has not been tampered with.

It is the aim of embodiments of the present invention to at least partly mitigate the above-mentioned problems.

SUMMARY OF THE INVENTION

In accordance with a first aspect of the present invention there is provided a method of allocating a flow label for a packet data flow, comprising the steps of: determining a quality of service identifier for the data flow; generating an encoded value in dependence on the quality of service identifier; and allocating the quality of service identifier and the encoded value to the flow label for each data packet of the data flow.

The method may further comprise the steps of: transmitting each data packet of the data flow to a routing domain; generating a further encoded value in dependence on the quality of service identifier; comparing the further encoded value to the encoded value in the flow label; and selectively routing the data packets in dependence on the comparing step.

The encoded value may be further generated in dependence on a source identifier identifying the source of the data flow. The further encoded value may be further generated in dependence on the source identifier.

The encoded value may be further generated in dependence on a flow identifier uniquely identifying the data flow. The further encoded value may be further generated in dependence on the flow identifier.

The encoded value is preferably a hash value, and the generating step preferably comprises the use of a hash function.

The method may further comprise the steps of: transmitting each data packet of the data flow to a routing domain; generating a further encoded value in dependence on the quality of service identifier and the flow identifier in the flow label; comparing the further encoded value to the encoded value in the flow label, and selectively routing or selecting a QoS treatment of the data packets in dependence on the comparing step.

If the further encoded value matches the encoded value, the data packet may be forwarded to the routing domain.

If the further encoded value does not match the encoded value, the data packet may be dropped. If the further encoded value does not match the encoded value, a further quality of service identifier may be determined and allocated to the flow label, and the data packet may be selectively routed in dependence of the further quality of service identifier. The further quality of service identifier may be lower than the quality of service identifier.

The comparing step may be performed for the first data packet of the data flow. All subsequent packets of the data flow may be selectively routed in dependence on the comparing step for the first data packet. The comparing step may be performed for more than one data packet of the data flow. Each packet of the data flow may be selectively routed in dependence on a comparing step for that data packet or one or more previous data packets.

The step of determining the quality of service identifier may comprise: requesting a quality of service level for the data flow; and receiving the quality of service identifier for the data flow.

The quality of service identifier may be a differentiated services code point (DSCP). The routing domain is preferably an IP routing domain. The method preferably operates in a packet switched network. The data packet preferably comprises a data packet header, and said data packet header comprises the flow label.

In accordance with a further aspect of the present invention there is provided a device for allocating a flow label for a packet data flow, comprising: determining means adapted to determine a quality of service identifier for the data flow; generating means adapted to generate an encoded value in dependence on the quality of service identifier; and allocating means adapted to allocate the quality of service identifier and the encoded value to the flow label for each data packet of the data flow.

The determining means may be adapted to generate the quality of service identifier or to receive the quality of service identifier.

Said generating means may be adapted to further generate the encoded value in dependence on a source identifier, said source identifier identifying the source of the data flow. Said generating means is adapted to further generate the encoded value in dependence on a flow identifier, said flow identifier uniquely identifying the data flow.

The device may further comprise transmitting means adapted to transmit each data packet of the data flow, including the flow label, to a routing domain.

In a further aspect the present invention provides a routing domain interface device for receiving a data flow including data packets for transmission on the routing domain, said data packets including a flow label including a quality of service identifier and an encoded value, said encoded value being generated based on the quality of service identifier, the interface device comprising: generating means adapted to generate a further encoded value in dependence on the quality of service identifier in a flow label; comparing means adapted to compare the further encoded value to the encoded value in the flow label; and routing means adapted to selectively route the data packets in dependence on the comparing step.

The flow label further may include a source identifier identifying the source of the data flow, said encoded value being generated further based on said source identifier, wherein the generating means is further adapted to generate the further encoded value in further dependence on the source identifier, in addition to preferably using quality of service identification as an input. The flow label may further includes a flow identifier uniquely identifying the data flow, said encoded value being generated further based on said source identifier, wherein the generating means is further adapted to generate the further encoded value in further dependence on the flow identifier.

The routing means may be adapted to forward all data packets of the data flow to the routing domain if the further encoded value matches the encoded value for the first data packet. The routing means may be adapted to drop all data packets if the further encoded value does not match the encoded value for the first data packet.

The interface device may further include means, responsive to the further encoded value not matching the encoded value, adapted to determine a further quality of service identifier and allocate said further quality of service identifier to the flow label, and the routing means being further adapted to selectively route the data packet in dependence on the further quality of service identifier, or to perform other operations which affect the quality of service provided to the stream. The further quality of service identifier may identify a quality of service level lower than that associated with the quality of service identifier.

In a still further aspect the present invention provides a system for monitoring a packet data flow, comprising: a data flow source element including: determining means adapted to determine a quality of service identifier for the data flow; first generating means adapted to generate an encoded value in dependence on the quality of service identifier; allocating means adapted to allocate the quality of service identifier and the encoded value to the flow label for each data packet of the data flow; and transmitting means for forwarding data packets including flow labels to a routing domain; and a routing domain interface element including: receiving means for receiving data packets from the data flow source; second generating means adapted to generate a further encoded value in dependence on the quality of service identifier in a flow label of a data packet; comparing means adapted to compare the further encoded value to the encoded value in the flow label; and routing means adapted to selectively route the data packets in dependence on the comparing step.

The determining means may receive the quality of service identifier or generate the quality of service identifier. The system may further include a quality of service signaling entity, which entity may generate the quality of service identifier, or may generate the flow label for the packets of the data flow.

The allocating means may be adapted to allocate a flow identifier uniquely identifying the data flow to the flow label, said encoded value being generated further based on said flow identifier, wherein the generating means is further adapted to generate the further encoded value in further dependence on the flow identifier.

The allocating means may be adapted to allocate a source identifier identifying the source of the data flow to the flow label, said encoded value being generated further based on said source identifier, wherein the generating means is further adapted to generate the further encoded value in further dependence on the source identifier.

The determining means may be adapted to determine the quality of service identifier by: requesting a quality of service level for the data flow; and receiving the quality of service identifier for the data flow.

The encoded value may be a hash value, and the generating means may utilise a hash function. The quality of service identifier may be a differentiated services code point (DSCP).

The routing domain may be an IP routing domain. A packet switched network may include a system as defined. The data packet may comprise a data packet header, and said data packet header comprises the flow label. A mobile communication system may incorporate a system as defined.

Embodiments of the present invention provide a method for simultaneously using the flow label for both aggregate level identification, such as for QoS, and per-flow identification, such as to uniquely identify a flow.

Embodiments of the present invention also result in a more secure use of the flow label, providing an efficient way of validating the contents of the flow label, and rejecting a data flow if it has been tampered with.

Furthermore, embodiments of the present invention also make it possible to use a flow label with an IP domain with multiple DiffServ ingress routers (routers that handle data flow into a domain, such as an edge router) without knowing in advance, through which ingress router the flow enters the domain. This is possible, because each ingress router can verify the validity of the flow label marking without prior per-router configuration. An alternative to the scheme would require that a flow-specific filter be configured to each ingress router separately.

BRIEF DESCRIPTION OF DRAWINGS

For a better understanding of the present invention reference will now be made by way of example only to the accompanying drawings, in which:

FIG. 3 shows a flow label in an embodiment of the present invention;

DETAILED DESCRIPTION OF EMBODIMENTS

Figure 1:
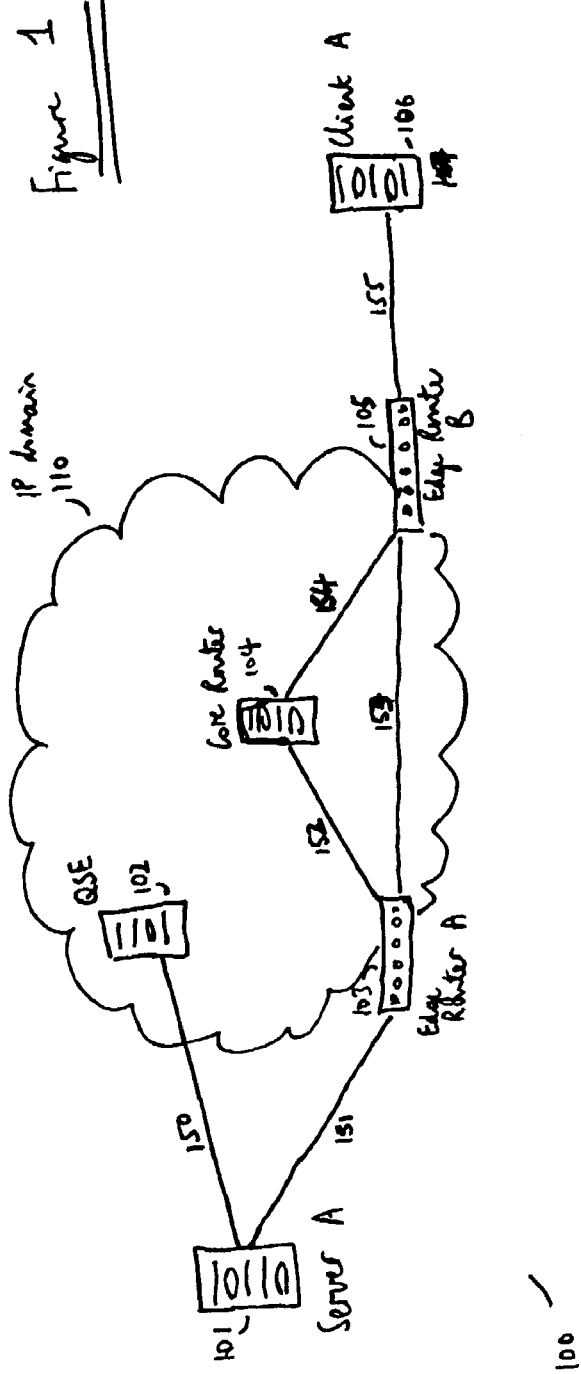
FIG. 1 illustrates a communications network for an embodiment of the present invention.

FIG. 1 shows a communications network 100 of an embodiment of the present invention comprising a server A 101, a QoS signaling entity, QSE, 102, an edge router A 103 and an edge router B 105, a core router 104, and a client A 106. The edge routers, QSE, and core router all belong to the IP routing domain 110. QoS in the IP domain is governed by the QSE. In a preferred embodiment, the QoS in the IP domain is supported using DiffServ, and associated markers such as DSCP.

The QSE and the server A can communicate with each other via communication link 150. The QSE and the server A can also be connected via the edge router A. The server A and the edge router A can communicate with each other via communication link 151. The edge router A is located at the edge of the IP domain. The edge router A can communicate with the core router and the edge router B via communication links 152 and 153 respectively. Furthermore, the edge router B, which is located at the edge of the IP domain, can communicate with the core router via communication link 154. The client A can communicate with the edge router B via communication link 155.

Communications between the elements in embodiments of the present invention are performed under TCP/IP and/or UDP/IP (User Datagram Protocol/Internet Protocol), but any other suitable packet switched protocol may be used. Data sent in the communications between a source and a destination is in the form of individual data packets. Related groups of data packets between two communication endpoints form a data flow. Each data packet has a header that contains information for use by elements in the network, such as the routers, to route the packet towards the destination.

Figure 2:
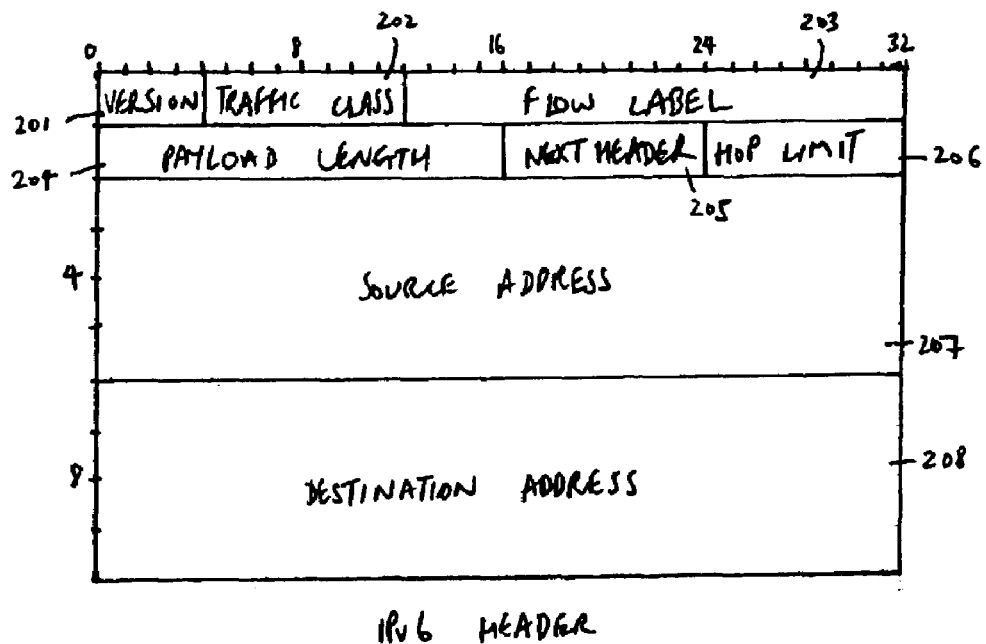
FIG. 2 shows the typical layout of an IPv6 header.

FIG. 2 shows the layout of a typical IPv6 header. The header shown comprises 8 fields in total: a 4 bit version field 201, an 8 bit traffic class field 202, a 20 bit flow label field 203, a 16 bit payload length field 204, an 8 bit next header field 205, an 8 bit hop limit field 206, an 128 bit source address field 207 and an 128 destination address field 208.

FIG. 3 shows a typical flow label 300 with a traffic aggregate identifier 302 forming part of the label. The remainder 304 of the flow label may be used for other purposes such as data for a per-flow identifier, padded with random data bits or left empty. The flow label as defined in IPv6 is 20 bits long.

In an embodiment of the present invention, the server A may send data to the client A via the IP domain, with QoS requests processed by the QSE. The client A may be any network element that is configured to receive a flow of data, such as a server, PC or laptop. Before the server A sends data to the client A, it first requests a certain quality of service for the flow from the QSE. Any suitable signaling protocol can be used for this purpose, for example, the Resource Reservation Protocol (RSVP) as defined by IETF. The QSE returns a flow label 300 to the server A marked with a traffic aggregate identifier 302 corresponding to the desired quality of service level, which can be considered a quality of service identifier. In preferred embodiments, the identifier can be a DSCP or any other suitable data field that can be utilized by the architecture described below. It should be appreciated that whilst in this embodiment the QSE provides the server A with the flow label, it is also possible that the client A provides the server A with the flow label.

The server A then uses the flow label to mark all the data packets in the data flow that server A intends to send to client A. The flow label is located in the header of a data packet. The header will also contain other routing information such as the addresses of the source and destination. As discussed in the background to the invention, the triplet of the flow label, source and destination address are intended to form a unique classifier for marking all the data packets in a data flow.

Each marked data packet is then sent individually from the server A to the edge router A, which examines the header of each data packet, including the flow label, and routes each data packet over the IP domain accordingly if the flow label can be identified as valid. If, for example, the destination for the data flow is the client A, then the edge router A will forward all the data packets in the data flow towards the client A. This may be done by routing directly to the edge router B, or via some intermediate element such as the core router 104.

In a preferred embodiment of the present invention, 'theft-of-service' is prevented by generating at the QSE a an encoded value, preferably a cryptographic hash value, based in the preferred embodiment on the QoS identifier (i.e. the traffic aggregate identifier, such as a DSCP) and the address of the data source (i.e. the address of server A), and then marking both the QoS identifier and the encoded value into the flow label. This encoded value may be generated using any suitable algorithm or hash function that takes as an input a block of data and produces an output or hash value that is dependent on the input data block. Typically, hash functions produce the same hash value given the same input twice and should be difficult to operate in the reverse direction.

As is clear from the above, in the preferred embodiment of the present the encoded value is a cryptographic hash value. However, more generally the invention is directed to the use of any encoded value that is based, at least partially, on the QoS identifier. As also is clear from the above, the QoS identifier, also referred to as a traffic aggregate identifier, is in the preferred embodiment a DSCP value. However the invention is not limited specifically to the use of a DSCP value, and the QoS identifier more generally is required to indicate a service level for a data flow.

In the above description of a preferred embodiment, the encoded value is generated based on the QoS identifier and the address of the data source, i.e. the source address. However the invention is not limited to such a specific limitation. By using the address of the data source in the generation of the hash value use of the same flow label by other network nodes, which will have different source addresses, can be prevented. Thus the use of the source address in the generation of the encoded value is a preferred implementation. However, more generally the encoded value is based primarily on the QoS identifier. As discussed further hereinbelow, the encoded value may in further embodiments be further optionally based on other parameters in addition to the QoS identifier.

In the preferred embodiment, the server A uses the flow label, marked with a DSCP value and a hash value, to mark all data packets in a data flow for sending to the client A. The data packets are sent to the edge of the IP domain, where the edge router A recomputes a further hash value, based on the QoS identifier in the flow label and the address of the data source in the data packet header, and compares it with the hash value marked in the flow label to validate the flow label and thus the data flow associated with the flow label. A filter can be configured at the edge router A, where all packets with a positively validated hash value can be passed through and routed as before, and those with a negatively validated hash value can be discarded.

A QoS marking that has been altered in any way between the QSE and the edge router A will not pass the validation process, as the hash value computed at the edge router will not match that in the flow label.

Figure 4:
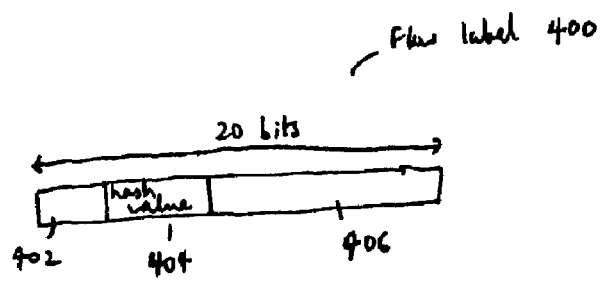
FIG. 4 shows a flow label in a preferred embodiment of the present invention.

FIG. 4 shows the layout of a flow label 400 in an embodiment of the present invention after allocation of a DSCP and hash value. The label comprises a QoS identifier or traffic aggregate identifier 402, a hash value 404, and other data 406, which could comprise a per-flow identifier, as discussed further hereinbelow.

Figure 5:
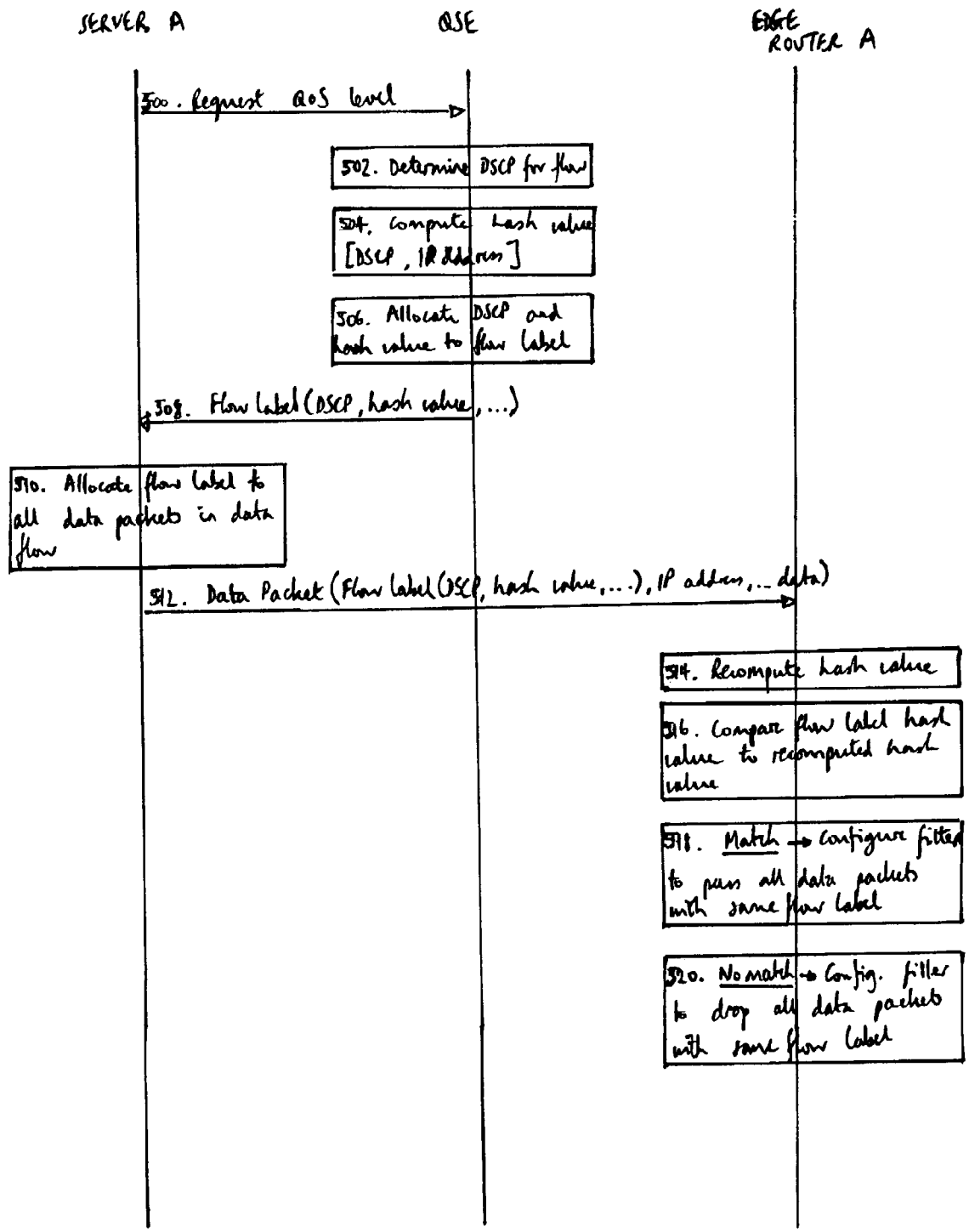
FIG. 5 shows a message flow diagram in a preferred embodiment of the present invention.

FIG. 5 shows a typical message flow from the server A to the edge router A and associated processing steps at the elements for the method of allocating a flow label to prevent 'theft-of-service' as described above, in accordance with a preferred embodiment.

The function of the elements in FIG. 1, in relation to how a flow label is allocated and subsequent authentication, will now be described in more detail at first with reference to the message flow diagram of FIG. 5.

FIG. 5 describes the following:
1. The server A 101 sends, in step 500, a QoS level request message to the QSE 102 for QoS level to be allocated to a data flow.
2. The QSE determines a QoS identifier or traffic aggregate identifier, such as a DSCP, for the flow corresponding to the QoS level request message, in step 502.
3. The QSE generates a hash value based on the DSCP and the IP address of the server A, in step 504.
4. The QSE allocates the DSCP and the hash value to elements 402 and 404 respectively of the flow label, in step 506, and sends the complete flow label to the server A, in step 508.
5. The server A allocates the flow label to all data packet headers of the data flow to be sent, in step 510.
6. The server A sends, in step 512, the data packets marked with the flow labels to the edge router A 103.
7. The edge router A receives the data packets and for the first data packet of a new flow re-generates, in step 514, the hash value based on the received DSCP and IP address of the server A, which parameters are contained in the flow label of the packet.
8. The edge router A then compares the re-generated hash value with that in the flow label, in step 516.
9. If the hash values do match, then a filter is configured at the edge router A to pass this data packet and all subsequent data packets marked with the same flow label without further checking, in step 518.
10. If the hash values do not match, then a filter is configured at the edge router A to drop this and all subsequent data packets marked with the same flow label, in step 520.

Although the above steps indicate that the validation is carried out for the first data packet of a data flow, in different embodiments the validation may be carried out in further or all data packets of a data flow, in accordance with implementation requirements.

Although in step 10 of the preferred embodiment the first and subsequent data packets are dropped if the validation fails, in alternative embodiments the subsequent data packets may be forwarded, but with a different quality of service identifier, typically lower than that indicated in the original flow label, inserted. This new identifier replaces the original one found in the flow label.

Although the marking in the above embodiment is described with reference to a cryptographic hash, it is emphasised that any suitable checking technique could be used in addition to the method described herein to verify whether tampering has taken place. For example, a checksum, parity check, or other suitable algorithm that can derive a value based on the input values used in the technique may be used.

Marking of additional information in the flow label in addition to a QoS identifier or traffic aggregate identifier may be needed to fulfil the uniqueness requirement for the triplet containing the flow label, source IP address and destination IP address. For example, two flows from the same source could be allocated the same QoS identifier or traffic aggregate identifier and therefore the same hash value, either simultaneously or sequentially, and thus unique identification of the flow may not be possible by the QoS identifier only.

In another embodiment of the present invention, therefore, this problem is overcome by utilising at least some of the remaining bits 406 of the flow label as a per-flow identifier. The per-flow identifier is a unique set of bits allocated to a data flow and reserved for use by that data flow. The generation of the unique set of bits forming the per-flow identifier is outside the scope of the present invention, and will be understood by one skilled in the art.

In a particular preferred embodiment, the encoded value is additionally based on the per-flow identifier. Thus the encoded value may be based on both the QoS identifier and the per-flow identifier. When additionally based on the per-flow identifier, in addition to providing a theft-of-service check the encoded value also additionally itself provide a unique identifier for the flow, being partially based on the unique per-flow identifier. In an especially preferred embodiment the encoded value is based on the QoS identifier, the source address, and the per-flow identifier.

The allocation of the bits 406 for use as a per-flow identifier may be done at the QSE, either when the QoS identifier is allocated, or initially at the server A, or at some other suitably configured network element. The per-flow identifier can then be used in generating the hash value.

In a further embodiment where the per-flow identifier is used in generating the hash value, the per-flow identifier is either passed in step 500 from the server A to the QSE together with the request for a QoS message, or generated by the QSE in step 502. The QSE then allocates the DSCP, the hash value and the per-flow identifier to elements 402, 404 and 406 respectively of the flow label, and sends the flow label to the server A, in step 408.

The embodiments described have the advantage of making it possible to verify the consistency of the QoS identifier embedded within the flow label locally, without any prior configuration of a filter into the edge routers. Thus, the QoS class can be extracted from the flow label in a number of edge routers without fear of theft of service.

It should be appreciated that although embodiments of the present invention have been described in the context of an IP network operating under DiffServ, other suitable packet switched networks and QoS models could be used.

Although only two edge routers, one core router, and one server are shown to comprise the IP domain, it should be appreciated that the domain could comprise further servers, edge and core routers. Furthermore, server A could be replaced with a client B so that the communication takes place between client A and client B. It should also be noted that due to the packet switched connectionless nature of the IP network, the connections between the server A and the client A, or between two clients A and B, may vary for each data packet transmitted. The connections shown are merely exemplifying and a person skilled in the art will appreciate that other connections and elements, such as further core routers, could be added without departing from the scope of the invention.

It is also noted herein that while the above describes exemplifying embodiments of the invention, there are several variations and modifications which may be made to the disclosed solution without departing from the scope of the present invention as defined in the appended claims.

The invention claimed is:

1. A method of allocating a flow label for a packet data flow, comprising:
   determining a quality of service identifier for the data flow;
   generating an encoded value in dependence on the quality of service identifier; and
   allocating the quality of service identifier and the encoded value to the flow label for each data packet of the data flow.

2. The method according to claim 1, further comprising:
transmitting each data packet of the data flow to a routing domain;
generating a further encoded value in dependence on the quality of service identifier;
comparing the further encoded value to the encoded value in the flow label; and
selectively routing the data packets in dependence on the comparing.

3. The method according to claim 2, wherein, if the further encoded value matches the encoded value, the data packet is forwarded to the routing domain.

4. The method according to claim 2, wherein, if the further encoded value does not match the encoded value, the data packet is dropped.

5. The method according to claim 2, further comprising: if the further encoded value does not match the encoded value, determining a further quality of service identifier for the data flow and allocating the determined further quality of service identifier to the flow label, wherein the data packet is selectively routed in dependence on the further quality of service identifier.

6. The method according to claim 5, wherein the further quality of service identifier identifies a lower quality of service level than the one corresponding to the quality of service identifier marked within the flow label.

7. The method according to claim 2, wherein comparing is performed for a first data packet of the data flow.

8. The method according to claim 7, wherein all subsequent packets of the data flow are selectively routed in dependence on the comparing for the first data packet.

9. The method according to claim 2, wherein the routing domain is an IP routing domain.

10. The method according to claim 1, wherein the encoded value is further generated in dependence on a source identifier identifying the source of the data flow.

11. The method according to claim 10, further comprising:
transmitting each data packet of the data flow to a routing domain,
generating a further encoded value in dependence on the quality of service identifier and the source identifier in the flow label,
comparing the further encoded value to the encoded value in the flow label, and
selectively routing the data packets in dependence on the comparing.

12. The method according to claim 1, further comprising allocating a flow identifier to the flow label, said flow identifier uniquely identifying the data flow, wherein the encoded value is further generated in dependence on the flow identifier.

13. The method according to claim 12, further comprising:
transmitting each data packet of the data flow to a routing domain,
generating a further encoded value in dependence on the quality of service identifier and the flow identifier in the flow label,
comparing the further encoded value to the encoded value in the flow label, and
selectively routing the data packets in dependence on the comparing.

14. The method according to claim 1, wherein determining the quality of service identifier comprises: requesting a quality of service level for the data flow; and receiving the quality of service identifier for the data flow.

15. The method according to claim 1, wherein the encoded value is a hash value, and the generating comprises using a hash function.

16. The method according to claim 1, wherein the quality of service identifier is a differentiated services code point.

17. The method according to claim 1, wherein the method is configured to operate in a packet switched network.

18. The method according to claim 1, wherein the data packet comprises a data packet header, and said data packet header comprises the flow label.

19. A device for allocating a flow label for a packet data flow, comprising:
determining means configured to determine a quality of service identifier for the data flow;
generating means configured to generate an encoded value in dependence on the quality of service identifier; and
allocating means configured to allocate the quality of service identifier and the encoded value to the flow label for each data packet of the data flow.

20. The device according to claim 19, wherein said generating means is configured to further generate the encoded value in dependence on a source identifier, said source identifier identifying the source of the data flow.

21. The device according to claim 19, wherein said generating means is configured to further generate the encoded value in dependence on a flow identifier, said flow identifier uniquely identifying the data flow.

22. The device according to claim 19, further comprising: transmitting means configured to transmit each data packet of the data flow, including the flow label, to a routing domain.

23. A routing domain interface device for receiving a data flow including data packets for transmission on the routing domain, said data packets including a flow label including a quality of service identifier and an encoded value, said encoded value being generated based on the quality of service identifier, the interface device comprising:
generating means configured to generate a further encoded value in dependence on the quality of service identifier in the flow label;
comparing means configured to compare the further encoded value to the encoded value in the flow label; and
routing means configured to selectively route the data packets in dependence on the comparing.

24. The interface device according to claim 23, wherein the flow label further includes a source identifier identifying the source of the data flow, said encoded value being generated further based on said source identifier, wherein the generating means is further configured to generate the further encoded value in further dependence on the source identifier.

25. The interface device according to claim 23, wherein the flow label further includes a flow identifier uniquely identifying the data flow, said encoded value being generated further based on said flow identifier, wherein the generating means is further configured to generate the further encoded value in further dependence on the flow identifier.

26. The interface device according to claim 23, wherein the routing means is configured to forward all data packets of the data flow to the routing domain if the further encoded value matches the encoded value for a first data packet.

27. The interface device according to claim 23, wherein the routing means is configured to drop all data packets, if the further encoded value does not match the encoded value for the first data packet.

28. The interface device according to claim 23, further including means, responsive to the further encoded value not matching the encoded value, configured to determine a further quality of service identifier and allocate said further quality of service identifier to the flow label, and the routing means being further configured to selectively route the data packet in dependence on the further quality of service identifier.

29. An interface device according to claim 28, wherein the further quality of service identifier identifies a quality of service level lower than that associated with the quality of service identifier.

30. A system for monitoring a packet data flow, comprising:
a data flow source element including:
determining means configured to determine a quality of service identifier for the data flow;
first generating means configured to generate an encoded value in dependence on the quality of service identifier;
allocating means configured to allocate the quality of service identifier and the encoded value to a flow label for each data packet of the data flow; and
transmitting means for forwarding data packets including flow labels to a routing domain; and
a routing domain interface element including:
receiving means for receiving data packets from the data flow source;
second generating means configured to generate a further encoded value in dependence on the quality of service identifier in the flow label of a data packet;
comparing means configured to compare the further encoded value to the encoded value in the flow label; and
routing means configured to selectively route the data packets in dependence on the comparing.

31. The system according to claim 30, wherein the allocating means is configured to allocate a flow identifier uniquely identifying the data flow to the flow label, said encoded value being generated further based on said flow identifier, and wherein the second generating means is further configured to generate the further encoded value in further dependence on the flow identifier.

32. The system according to claim 30, wherein the allocating means is configured to allocate a source identifier identifying the source of the data flow to the flow label, said encoded value being generated further based on said source identifier, and wherein the second generating means is further configured to generate the further encoded value in further dependence on the source identifier.

33. The system according to claims 30, wherein the determining means is configured to determine the quality of service identifier by: requesting a quality of service level for the data flow; and receiving the quality of service identifier for the data flow.

34. The system according to claim 30, wherein the encoded value is a hash value, and the first generating means utilises a hash function.

35. The system according to claim 30, wherein the quality of service identifier is a differentiated services code point.

36. The system according to claim 30, wherein the routing domain is an IP routing domain.

37. The system according to claim 30, wherein the system is configured operate in a packet switched network.

38. The system according to claim 30, wherein the data packet comprises a data packet header, and said data packet header comprises the flow label.

39. The system according to claim 30, wherein the system is configured to operate in a mobile communication system.

* * * * *